(12) United States Patent
Morab Vishwanath

(10) Patent No.: US 12,506,534 B2
(45) Date of Patent: Dec. 23, 2025

(54) METHOD FOR DATA TRANSMISSION FROM A SPACECRAFT TO GROUND VIA A FREE SPACE OPTICAL CHANNEL

(71) Applicant: DEUTSCHES ZENTRUM FÜR LUFT-UND RAUMFAHRT E.V., Bonn (DE)

(72) Inventor: Anil Morab Vishwanath, Munich (DE)

(73) Assignee: DEUTSCHES ZENTRUM FÜR LUFT-UND RAUMFAHRT E.V., Bonn (DE)

( * ) Notice: Subject to any disclaimer, the term of this patent is extended or adjusted under 35 U.S.C. 154(b) by 241 days.

(21) Appl. No.: 18/037,099

(22) PCT Filed: Dec. 1, 2021

(86) PCT No.: PCT/EP2021/083749
§ 371 (c)(1),
(2) Date: May 16, 2023

(87) PCT Pub. No.: WO2022/117638
PCT Pub. Date: Jun. 9, 2022

(65) Prior Publication Data
US 2023/0421251 A1      Dec. 28, 2023

(30) Foreign Application Priority Data
Dec. 3, 2020   (DE) .................. 10-2020-132-178.3

(51) Int. Cl.
*H04B 10/118*       (2013.01)
*H04B 7/185*        (2006.01)

(52) U.S. Cl.
CPC ..... *H04B 7/18582* (2013.01); *H04B 7/18589* (2013.01); *H04B 10/118* (2013.01)

(58) Field of Classification Search
CPC ...................... H04B 10/118; H04B 7/185–195
See application file for complete search history.

(56) References Cited

U.S. PATENT DOCUMENTS

| | | | |
|---|---|---|---|
| 6,178,470 B1 * | 1/2001 | Dowling | H04L 69/12 710/52 |
| 9,871,608 B1 * | 1/2018 | Chang | H04Q 9/00 |

(Continued)

FOREIGN PATENT DOCUMENTS

| | | |
|---|---|---|
| DE | 69217747 T2 | 10/1997 |
| EP | 2785010 A1 | 10/2014 |

(Continued)

OTHER PUBLICATIONS

CCSDS Secretariat, "Recommendation for Space Data System Standards: Optical Communications Coding and Synchronization", https://public.ccsds.org/Pubs, p. 1-70, (Aug. 2019). (Year: 2019).*

(Continued)

*Primary Examiner* — Nathan M Cors
(74) *Attorney, Agent, or Firm* — Christensen, Fonder, Dardi PLLC; Andrew H. Auderieth; Peter S. Dardi (57) ABSTRACT

The method for file transmission from a spacecraft to ground via a Free Space Optical channel comprises the use of the Consultative Committee for Space Data Systems (CCSDS) standard with assigning a File ID in the Secondary Header and dividing the transmission of the file into several fractions. The type of fraction, namely Start Transfer Frame, Intermediate Transfer Frame, or End Transfer Frame is identified in the Secondary Header. Also, the File ID, File length, and Name of the file is included in the Secondary Header of the Start Transfer Frame while information about the File ID is included also in the other two types Transfer Frames.

4 Claims, 4 Drawing Sheets

| | | | | | | | |
|---|---|---|---|---|---|---|---|
| | | | Secondary Header | | | | |
| Ver No. | Secondary Header length | S=1 | E | R | File ID | File Length | File Name |
| 2 | 6 | 1 | 1 | 2 | 12 | 32 | 456 |

(56) References Cited

U.S. PATENT DOCUMENTS

2004/0043725 A1* 3/2004 Satoh .............. H04B 7/2125
  455/11.1
2017/0099606 A1* 4/2017 Chang .............. H04W 72/23

FOREIGN PATENT DOCUMENTS

WO 1992-013410 A1 8/1992
WO 2010-059739 A1 5/2010

OTHER PUBLICATIONS

CCSDS Secretariat, "Recommendation for Space Data System Standards: Optical Communications Coding and Synchronization", https://public.cosds.org/Pubs, p. 1-70, (Aug. 2019).

CCSDS Secretariat, "Recommendation for Space Data System Standards: Space Packet Protocol", https://public.ccsds.org/Pubs, p. 1-54, (Jun. 2020).

CCSDS Secretariat, "Recommendation for Space Data System Standards: CCSDS File Delivery Protocol (CFDP)", https://public.ccsds.org/Pubs, p. 1-151, (Jul. 2020).

CCSDS Secretariat, "Recommendation for Space Data System Standards: CCSDS File Delivery Protocol (CFDP) Part 1: Introduction and Overview", https://public.ccsds.org/Pubs, p. 1-52, (May 2021).

CCSDS Secretariat, "Recommendation for Space Data System Standards: TM Space Data Link Protocol", https://public.ccsds.org/Pubs, p. 1-115, (Oct. 2021).

CCSDS Secretariat, "Recommendation for Space Data System Standards:TM Synchronization and Channel Coding", https://public.ccsds.org/Pubs, p. 1-108, (Apr. 2022).

Giggenbach et al., "Space Communications Protocols for Future Optical Satellite-Downlinks", International Astronautical Federation, vol. 11 (B2.2.8), p. 1-12, (2011).

International Search Report for corresponding Patent Application No. PCT/EP2021/083749 dated Mar. 11, 2022.

* cited by examiner

METHOD FOR DATA TRANSMISSION FROM A SPACECRAFT TO GROUND VIA A FREE SPACE OPTICAL CHANNEL

CROSS REFERENCE TO RELATED APPLICATIONS

This application is a National Stage filing of PCT Application No. PCT/EP2021/083749 filed Dec. 1, 2021, entitled Method for Data Transmission from a Spacecraft to Ground Via a Free Space Optical Channel, which claims, for the subject matter of the present PCT application, the priority of the previous German patent application 10 2020 132 178.3 filed on Dec. 3, 2020 wherein the subject matter of this previous German patent application is incorporated by reference herewith.

The present invention relates to a method for file transmission from a spacecraft like e.g. a CubeSat, to ground via a Free Space Optical channel.

Optical satellite communication is drawing a lot of attention over the past few years. The advantages that this technology has to offer over its traditional RF counterparts includes very high data rates due to higher frequency of infrared spectrum, lower energy consumption, lower beam divergence and inherent security against eavesdropping. With the advent of "New Space" era, wherein the space industry is transitioning from developing large and costly Spacecrafts towards cost-efficient and much smaller CubeSats, these advantages make optical satellite communication an extremely high-valued asset. A constellation of CubeSats carrying this technology would be an irresistible option for applications such as earth observation and monitoring, where transmission of mission data, such as pictures, to the ground is routinely necessary. Traditional file transfer applications such as FTP or CFDP, is often not feasible on CubeSats, since they are often limited in processing power and in resources. Therefore, a need for protocol with minimum overhead becomes extremely important.

One of the drawbacks of Free Space Optical communication is that it is rendered non-operational in the presence of clouds. One way to overcome this is by having ground station diversity and thus a network of Optical Ground Stations (OGS) so that if the downlink at a predetermined ground station is not possible, it can be performed at an alternate site. Interoperability and having a recommended standard hence become very important as economic considerations require consolidation of networks. The Consultative Committee for Space Data Systems (CCSDS) is working on providing a standard for the channel coding and synchronization of signals to be used in free space optical communications, based on the existing standards for RF systems.

In IP based networks, file transfer is performed using protocols such as (S)FTP which operate over TCP/IP. These applications are not feasible for space data communication as the space link is highly intermittent, asynchronous and has larger delays compared to terrestrial networks. This makes it impossible to transfer a large file in one single pass using such traditional applications.

This method of using provisional headers, reserved fields in order to adapt the system for existing networks and protocols have been proposed in inventions before. WO-A-92/13410 (corresponding to DE-T-692 17 747) proposes a method in which multicast addresses are preserved when communicating between LAN networks with different architectures, such as one with large multicast address space (e.g., IEEE 802.3 with approx. 140 trillion addresses) together with networks with small multicast address space (e.g, IEEE 802.5 with 24 to 31 addresses). When at least one first frame with a multicast address as its destination has to be transferred from IEEE 802.3 network through IEEE 802.5 network, the former communication system writes the functional address into a second frame along with the indicator field and forwards it to the IEEE 802.5 network. Based on the indicator field, the IEEE 802.5 network can interpret the representation of the multicast address, which then writes the multicast address translated from the functional address into a destination address field of a third frame before finally forwarding it to a different IEEE 802.3 network, which supports the multicast address structure of the first communication system thereby preserving the multicast address throughout the communication process.

It is not uncommon to propose adaptations and to build on existing standards in order to make the system efficient for certain use cases. WO-A-2010/059739 provides different methods for efficient control signaling over shared communication channels with wide dynamic range. It discusses how gateways can be configured to encode and transmit multiple modcode signals which include information regarding modulation, code rate, spreading factor, frame size etc. in their physical layer headers. The terminals decode their setting based on the headers they are configured to decode. The design for such adaptive coding, spreading, and modulating terminal along with the frame structures, FEC, modulation and encoding schemes are also provided.

CCSDS standard offers a service called CCSDS File Delivery Protocol (CFDP) in order to address these issues (see [1] to [4]). CFDP operates on the concept of "Virtual Filestores". It relies on the fact that the traditional Spacecrafts have very high processing power as well as access to large memory stores. This makes is possible for CFDP to transfer files to and from the spacecraft mass memory. Files can be transmitted with a unidirectional link, a half-duplex link, or a full-duplex link. The store and forward mechanism allow file transfers considering near-Earth and deep space delays. A decision to trigger the file transfer can also be made autonomously onboard the spacecraft or from the ground. In addition to the purely file delivery-related functions, CFDP also includes file management services to allow control over the storage medium. In its simplest form, the protocol provides a Core file delivery capability operating across a single link. For more complex mission scenarios, the protocol offers Extended operation providing store-and-forward functionality across an arbitrary network, containing multiple links with disparate availability, as well as subnetworks with heterogeneous protocols. In CFDP two modes are available: In the "unacknowledged" mode data delivery failures are not reported to the sender and, therefore, cannot be repaired, although errors will be detected, and erroneous data discarded. In the "acknowledged" mode, the receiver informs the sender of any undelivered file segments. These are then retransmitted, guaranteeing complete file delivery. All these make CFDP the preferred method for file transfer in traditional space data communication systems. However, this comprehensive protocol suite can only be built on top of existing CCSDS Packet level Service. This assumption might not necessarily be true in resource deprived systems such as CubeSats. Hence, CubeSat vendors often employ proprietary protocols for transferring files to the ground. Some employ protocol (such as CubeSat Space Protocol) similar to FTP, but without the overhead coming from IP header while others employ the concept of "virtual files" (COMPASS protocol suite) for transferring data to the ground (see also [5]).

The above-mentioned techniques are relevant for RF based systems. Although, in theory they can also be adapted to optical communication systems as well, they are not tailored to meet the challenges offered by FSO channel. The channel capacity of FSO channel varies significantly based on the atmospheric affects. The very small beam divergence of optical signal, pointing errors caused to micro vibrations on the satellite, errors due to the misalignments and the refractive index turbulence of the earth's atmosphere can all lead to fluctuations in the downlink signal. This in turn results in short-term reduction in received power at the telescope of an OGS, leading to loss of data. One way to address this issue is to employ strong Forward Error Correction (FEC) codes with sufficient redundancy (parity symbols) in the data transmission making it possible to correct the errors at the receiver later. Such techniques are predominant in all communication systems today. However, this technique is not without its own drawbacks. Since the downlink conditions vary significantly within each link, having very strong codes might be necessary when the link conditions are bad but become quite redundant when the link conditions are good. Secondly, the data transmission is not guaranteed just by the FEC. When the link conditions are extremely adverse, even strong codes may often fall short in correcting all errors induced by the channel. For this reason, FEC is often combined with Automatic Repeat Request (ARQ), in which the receiver requests missing data packages on the return link to the transmitter through acknowledgment (ACKs) schemes. However, ARQ for return link would have to consider the asymmetric channel capacities and the highly lossy return channel thereby increasing the complexity of design.

Accordingly, the prior art of file transmission over Free Space Optical channels for spacecrafts with limited resources have the following drawbacks:
- Traditional terrestrial file delivery applications such as (S)FTP are not suitable for space data communication as the space link is highly intermittent, asynchronous and has higher delays.
- Traditional space file delivery applications such as CFDP are not suitable for CubeSats as these "New Space" systems do not have high processing power and are resource limited. Having to implement the whole CCSDS stack just for transmitting files not only increases the complexity of design and implementation on such low-end embedded processors but also is not always possible.
- Due to the bandwidth limitations of the RF systems, a large file cannot be transferred to the ground in one single pass. A file has to be sent over multiple links often over a period of time. The extended features offered by CFDP works very well for such scenarios. For Optical communication systems which offers data rate of 100 Mbps-tens of Gigabit/s, store and forward approach is an overkill and often not necessary.
- Developing proprietary data transmission system would bring in interoperability issues. Also, developing a new file delivery protocol just for Free Space Optical data communication systems would require building ground station modems for data reception from scratch which has its own economic considerations.

It is the objective of the present invention to provide a file delivery method which is interoperable, while being compliant with a certain standard and which does not add a large overhead in terms of memory or processing power.

The present invention provides a method for file transmission from a spacecraft like e.g. a CubeSat, to ground via a Free Space Optical channel, compliant to the Consultative Committee for Space Data Systems (CCSDS) standard but without having the additional need for any higher layer protocols or CCSDS packet services or applications such as CFDP. It also describes the adaptations that shall be made to the current RF standard, for rendering it suitable for Free Space Optical (FSO) channels.

The method described here:
- is compliant to the CCSDS TM Synchronization and Channel Coding standard, wherein CCSDS amongst others define a Transfer Frame as a fixed length protocol data unit which in turn comprises amongst others a Secondary Header and a Data Field
- assigns a File ID to a file which is to be transmitted,
- divides the transmission of the file into a start fraction to be transmitted by a Start Transfer Frame which in its Data Field includes the start fraction of the file; and into multiple intermediate fractions to be transmitted by multiple Intermediate Transfer Frames with each Intermediate Transfer Frame including in its Data Field a respective intermediate fraction of the data field; and into an end fraction to be transmitted by an End Transfer Frame which in its Data Field includes the end fraction of the data file,
- wherein the Secondary Header of the Start Transfer Frame comprises information for specifying the Transfer Frame as the Start Transfer Frame,
- wherein the Secondary Header of each of the Intermediate Transfer Frames comprises information for specifying the Transfer Frame as an Intermediate Transfer Frame,
- wherein the Secondary Header of the End Transfer Frame comprises information for specifying the Transfer Frame as the End Transfer Frame,
- wherein the Secondary Header of the Start Transfer Frames comprises information about the File ID, File length and Name of the file which is to be transmitted, and
- wherein the Secondary Header of each of these Transfer Frames comprises information about the File ID.

This method of the invention inherently works for non-reliable data transmission (UDP-like) although it can be used with an additional ARQ, if the application desires guaranteed file delivery (TCP-like).

In accordance with specific embodiments of the present invention, the following adaptions are proposed for current CCSDS TM Synchronization and Channel Coding standard to suit Free Space Optical Communication channel
- Stronger code rates for Reed Solomon,
- Deep Interleavers (upto depth of 65536),
- Periodically inserting Synchronization Symbols in between the Transfer Frames,
- Adding a 32-bit Counter after every Synchronization Symbols for identifying the position of the Interleaved page.

The present invention will now be described in further detail referring to a specific embodiment and to the drawing in which.

In order to overcome the adversities of FSO communication, having strong protection through FEC (to overcome atmospheric effects) and having an interoperable system (to overcome effect of clouds through ground station diversity) seems inevitable. The Optical Communications Coding and Synchronization protocol specified in the CCSDS TM Synchronization and Channel Coding standard addresses these issues. This specification includes the functions for channel coding, interleaving, randomization and synchronization. It also provides the function of transferring transfer frames over the optical space link.

Figure 1:
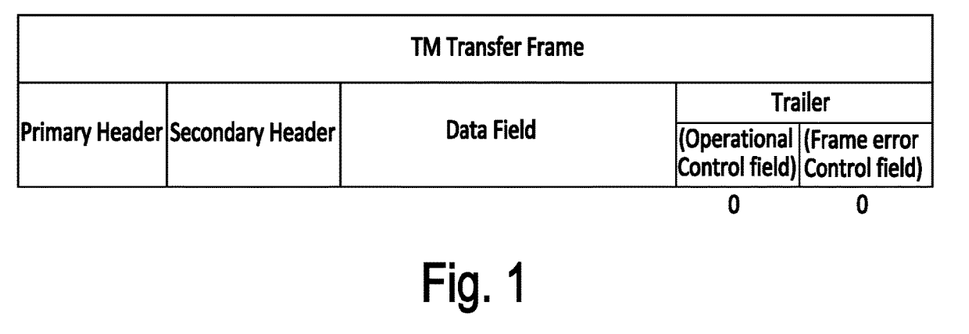
FIG. 1 shows the Transfer Frame structure in CCSDS.

In the CCSDS standard, TM Transfer frames are fixed length protocol data units with the structure shown in FIG. 1.

It contains the following fields:
 A mandatory 6 Byte Primary Header which includes Master Channel Identifier, Virtual Channel Identifier, Operational Control Field Flag, Master Channel Frame count,
 Virtual Channel Frame Count and lastly Transfer Frame Data Field Status
 An optional (upto) 64 Byte Secondary Header
 Data Field
 An optional 6 Byte Trailer which includes Operational Control Field and Frame Error Control Field.

In most applications the optional fields including Secondary Header and Trailer are left unused. The invention relates to a method in which the secondary header of the TM Transfer Frame shall be used to embed the file information and is in itself made adequate for file transmissions from Space to Ground over an optical channel. Each file that has to be transferred to the ground will be fragmented into appropriate length transfer frames categorized into following types:
 Start Frame: Beginning of the file, more frames shall follow
 Intermediate Frame: Intermediary frames of the file, more frames shall follow
 End Frame: Final frame marking the end of transmission of the current file A Start Frame comprises 64 bytes with the structure shown in FIG. 2.

Figure 2:
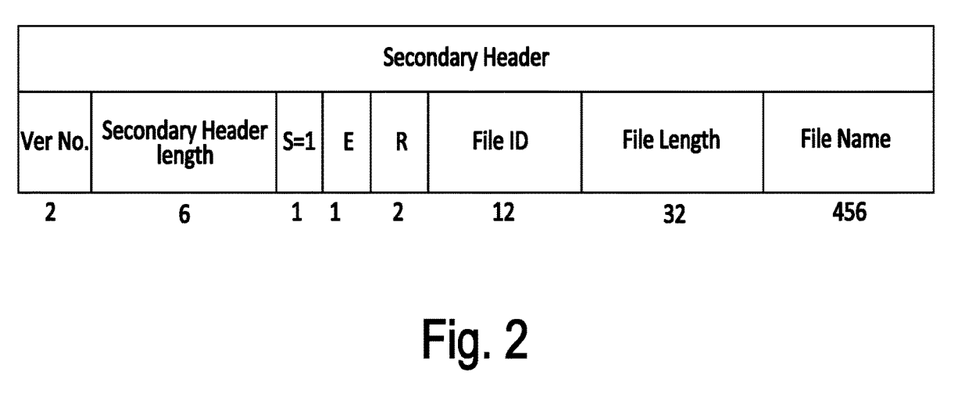
FIG. 2 shows the Start Frame Format according to the invention.

According to certain embodiments of the invention, the Start Frame Format can comprise the following field specifications:
 2 bit Version Number
 6 bit Secondary header length, header length can be a maximum of 64 bytes
 1 bit Start field indicating the beginning of the file transfer (will be 1 in this case)
 1 bit End field indicating the end of file transfer (will be 1 if this is also the end of the file, 0 otherwise)
 2 Reserved bits, can be used for example in identifying the coding scheme during adaptive coding
 12 bit File Identifier, maximum of 4096 files can be transferred during each link
 4 byte File Length filed indicating the length of the file. Maximum file size is 4 GB
 57 byte File Name. It can have a maximum of 57 characters An Intermediate/End Frame comprises 3 bytes with the structure shown in FIG. 3.

Figure 3:
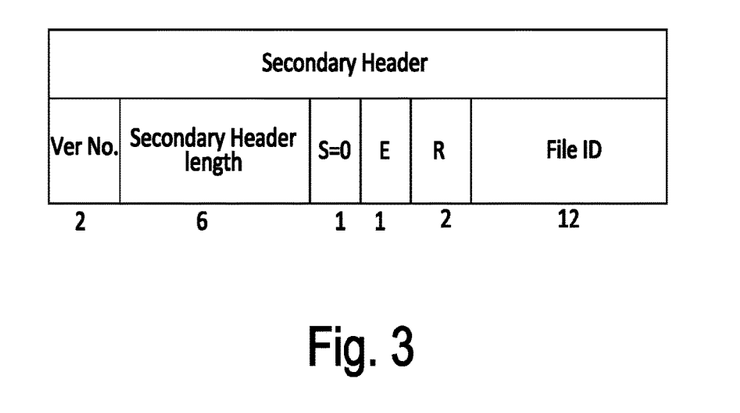
FIG. 3 shows the Intermediate and End Frame Formats according to the invention.

According to certain embodiments of the invention, the Intermediate/End Frame Format can comprise of the following field specifications:
 2 bit Version Number
 6 bit Secondary header length, header length can be a maximum of 64 bytes
 1 bit Start field indicating the beginning of the file transfer (will be 0 in this case)
 1 bit End field indicating the end of file transfer (will be 1 for End Frame, 0 for Intermediate Frame)
 2 Reserved bits, Can be used for example in identifying the coding scheme during adaptive coding
 12 bit File Identifier, maximum of 4096 files can be transferred during each link Although dependent on its size, usually each file will be fragmented into one start frame followed by multiple intermediate frames and finally an end frame. Each of these frames will contain information about a single file only. The File ID and File Length fields will assist in reassembling of the files at the receiver.

It must be noted that these headers are vital for reassembling the files. If the start frame is missing, even when all the intermediate frames and the end frame are received without any errors, it would not be possible to reassemble the file on the ground since some critical information such as the File Length and File Name are not available. Hence very strong protection against Headers is very important. For the sake of simplicity, when the start frame is not recoverable the missing Start Frame or the whole file can be retransmitted. Alternate approaches such as ARQ or sending the missing Frame over RF link can also be employed. When using ARQ for reliable delivery of files, an additional Frame Count field (from the primary header) shall be considered while reassembling the files.

The method according to the invention and described here does not bring any benefit for high end satellites which already have the CCSDS packet services available or already have standard networking stack such as TCP/IP at their disposal. The invention described here is targeted for smaller embedded processors such as in Cubesats, which do not have the luxury of implementing the CCSDS packet services just for the purpose of file transmission and yet are required to be interoperable for multiple ground stations.

Differences of the Invention to CFDP

The benefit of the invention will be further described in view of CFDP.

Figure 4:
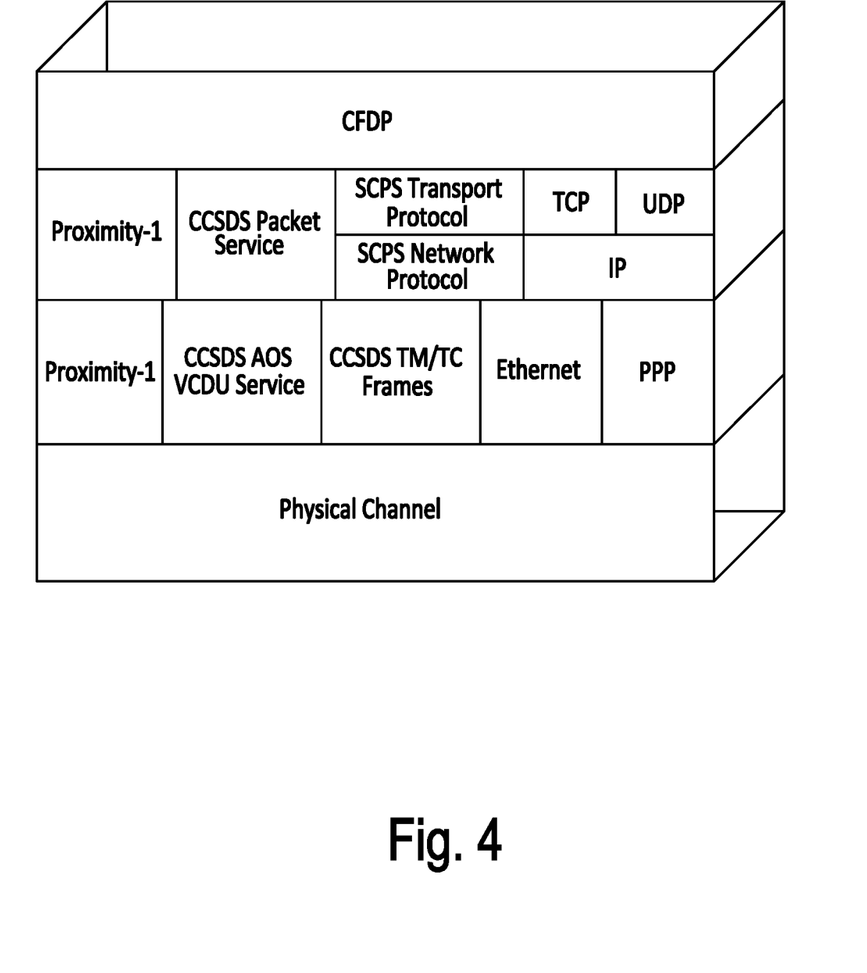
FIG. 4 shows the CFDP Protocol Stack.

CFDP is a more comprehensive protocol compared to the one proposed in this patent. It can perform operation on files such as: Put requests, Directory Listing, Status Report, Message to User, Filestore request, Fault handling etc. The protocol assumes the availability of an underlying communication system i.e, it has to be built on top of the existing packet standards such as CCSDS Packet Service, TCP/IP or UDP/IP (see FIG. 4).

However, in the method according to the invention, the file to be transmitted is implemented directly in the CCSDS TM/TC Frames, thereby foregoing the need for implementing any of the higher layer protocols and services.

Figure 5:
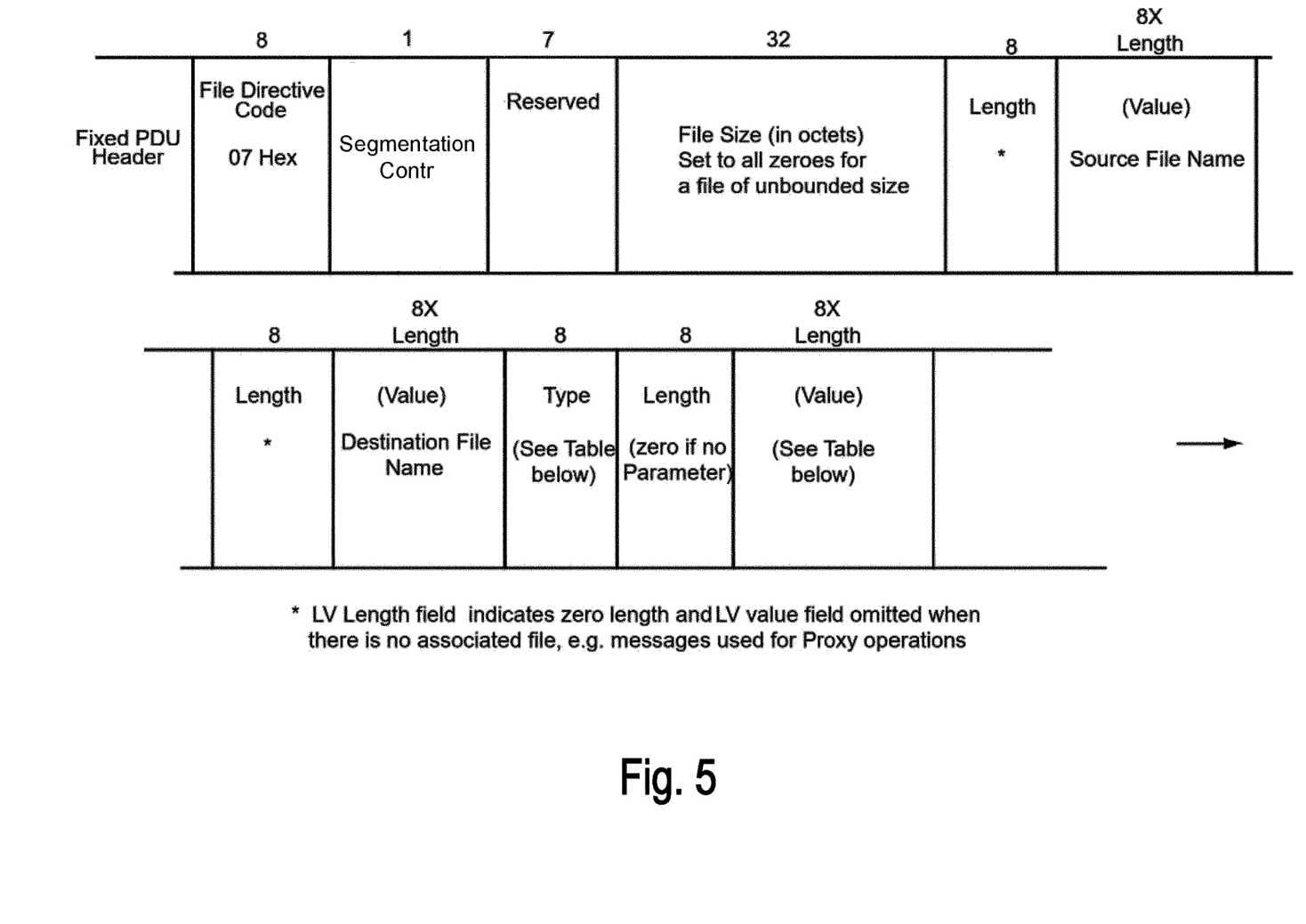
FIG. 5 shows Metadata PDU in CFDP.

In addition to the File content itself, CFDP Sender also transfers data, called the metadata, that aid the receiver in effectively utilizing the file. File Data PDUs convey the contents of the files being delivered, while File Directive PDUs convey only metadata and other non-file information that advances the operation of the protocol. The structure of the metadata PDU is shown in FIG. 5.

The method described for file transfer according to the present invention is different from that of conventional file transfer method such as CFDP. The complexity of such a system is very low. Since the optical links are capable of transferring tens of Gigabits per second, store and forward mechanism is not necessary (which typically is one of the biggest advantages of CFDP extended procedures).

Adaptations to CCSDS TM SYNCHRONIZATION AND CHANNEL CODING Blue Book

The CCSDS standard for High Photon Efficiency (HPE) data processing systems is proposed in the OPTICAL COMMUNICATIONS CODING AND SYNCHRONIZATION blue book [1]. However, this standard does not yet include (at the time of this invention) the O3K (on off keying) systems. Hence, a few adaptations on the existing CCSDS TM SYNCHRONIZATION AND CHANNEL CODING have also been included.

- Current Standard specifies Reed Solomon Encoder RS (255,223) with code rate 0,8745. Typically, these encoders can correct 16 symbols per codeword (223) symbols. As explained earlier, it is vital to have strong protection against the headers for the file transfer method according to the invention to perform efficiently. Hence an option is provided to have stronger code rates than specified by the standard.
- Current Standard specifies Interleaver depth of maximum 8. Optical channel is bursty in nature and it can have short fades that can last typically a few milliseconds. Having channel interleaver with a maximum depth of 8 does not serve this purpose. Hence an option is provided to have deep interleaver with depth up to 65536.
- Current Standard specifies having synchronization symbols just at the beginning of the transfer frames. The maximum length of transfer frames in RF is about 16320 bits. However, because of the deep interleaver and because of the very high data rates of the optical communication system, the maximum length of the transfer frame can extend up to a few million bits. This will most definitely complicate the receivers on the ground. In order to avoid this issue, an option is provided to have Synchronization symbols in between the transfer frames.

Figure 6:
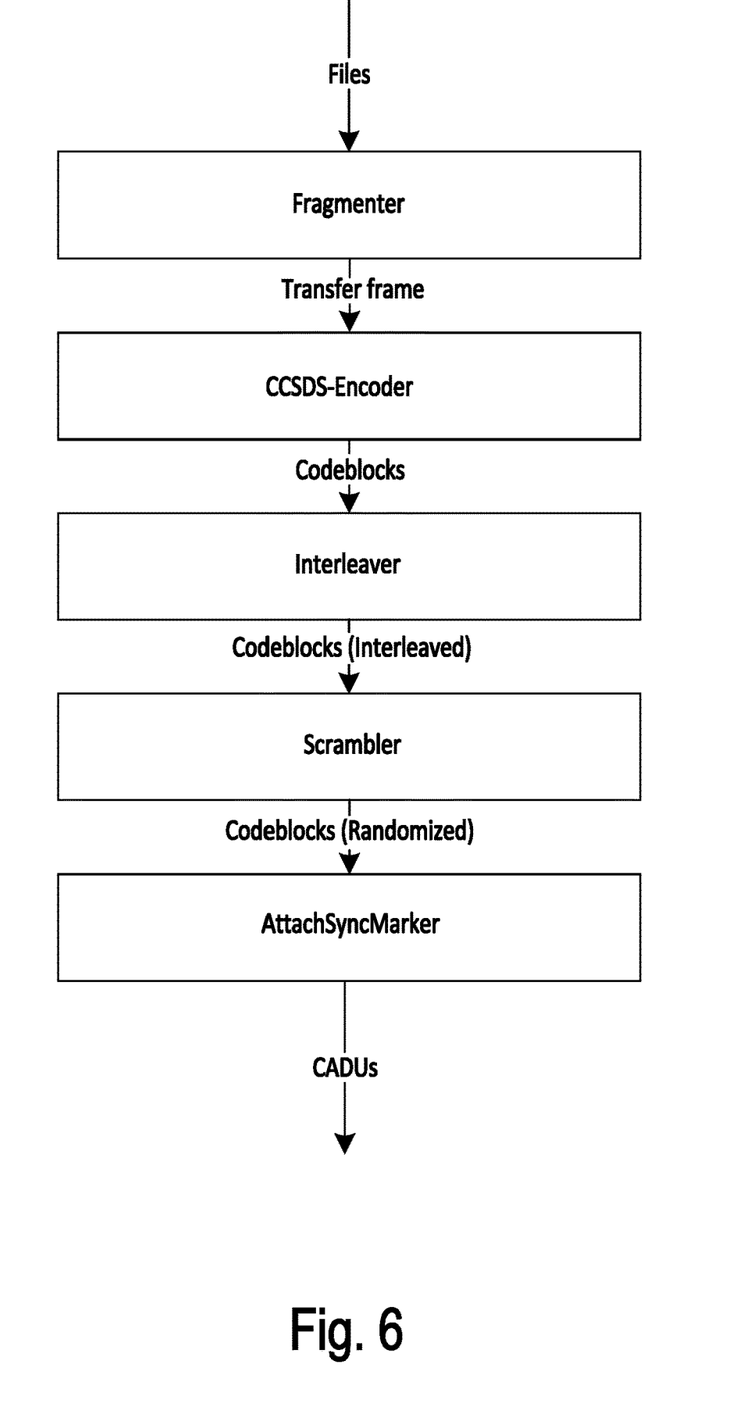
FIG. 6 shows a functional block diagram of CCSDS Optical Data Link layer with additional Fragmenter The present invention relates to a very simple method for transmission of files from optical satellite terminals to the ground complying with this standard but without having the additional need for any higher layer protocols or applications. In the specification the adaptions are described that should be made to the current RF standard, for rendering it suitable for Free Space Optical (FSO) channels.

A complete functional block diagram of the CCSDS Optical Data Link Layer together with the proposed Fragmenter is seen in FIG. 6.

The Fragmenter module is responsible for converting files into respective Start/Intermediate/End Frames. These Frames are further processed by a Reed Solomon Encoder (with variable code rates) for adding redundancy/parity symbols so that it is possible to correct the errors at the receiver. The Codeblocks are then sent through an Interleaver module. Free Space Optical channel is bursty in nature and often induces short fades (lasting a few milliseconds). Having a deep Interleaver will spread the errors over multiple Codeblocks making it possible to correct the errors at the receiver. The Codeblocks are further sent through a Scrambler for helping with randomization and DC balancing. Finally, a Synchronization Marker is attached at the beginning/or in between the transfer frame and the obtained channel access data unit (CADU) will be sent over the optical channel. This setup allows some of the existing RF modem infrastructure to be reused for Optical satellite communication systems.

The invention can be used for file transfer in following applications
  File transfer from optical terminals on Spacecraft/UAV/ HAPs to ground
  Earth observation satellites or Remote sensing satellites that have to transfer pictures to the ground
  File transfer from any space data communication system that is compliant with CCSDS TM SYNCHRONIZATION AND CHANNEL CODING standard

LIST OF REFERENCES

[1] CCSDS OPTICAL COMMUNICATIONS CODING AND SYNCHRONIZATION Blue Book: https://public.ccsds.org/Pubs/142x0b1.pdf
[2] CCSDS TM SYNCHRONIZATION AND CHANNEL CODING Blue Book: https://public.ccsds.org/Pubs/131x0b3e1.pdf
[3] CCSDS FILE DELIVERY PROTOCOL (CFDP) INTRODUCTION AND OVERVIEW Green Book: https://public.ccsds.org/Pubs/720x1g3.pdf
[4] CCSDS TM SPACE DATA LINK PROTOCOL Blue Book: https://public.ccsds.org/Pubs/132x0b2.pdf
[5] Giggenbach, Dirk & Moll, Florian & Fuchs, Christian & Cola, Tomaso & Mata Calvo, Ramon. (2011). Space communications protocols for future optical satellite-downlinks. 62nd International Astronautical Congress 2011, IAC 2011. 4
WO-A-92/13410
WO-A-2010/059739

LIST OF ABBREVIATIONS

FTP File Transfer Protocol
CFDP CSSDS File Delivery Protocol
OGS Optical Ground Station
CCSDS Consultative Committee for Space Data Systems
FSO (channel) Free Space Optical (channel)
TCP Transmission Control Protocol
IP Internet Protocol
FEC Forward Error Correction
ARQ Automatic Repeat Request
ACKs Acknowledgement schemes
UDP User Datagram Protocol
PDU Protocol Data Unit
HPE High Photon Efficiency
UAV Unmanned (or uninhabitated or unpiloted) Aerial Vehicle
HAP High Altitude Platform

The invention claimed is:

1. A method for file transmission from a spacecraft to ground via an optical channel, in accordance with the Consultative Committee for Space Data Systems (CCSDS) 142.0-B-1 standard, wherein the CCSDS 142.0-B-1 standard define a transfer frame as a fixed length protocol data unit which in turn comprises a primary header, a secondary header, and a data field, the method comprising
  transmitting an optical data stream comprising a series of fixed length data units, each transmission comprising the steps of:
  assigning a file ID to a file which is to be transmitted,
  dividing the transmission of the file into a start fraction to be transmitted by a start frame which in its data field includes the start fraction of the file, and into multiple intermediate fractions to be transmitted by multiple intermediate transfer frames with each intermediate transfer frame including in its data field a respective intermediate fraction of the data field, and into an end fraction to be transmitted by an end transfer frame which in its data field includes the end fraction of the data file, wherein the Secondary Header a secondary header of the start transfer frame comprises information for specifying the transfer frame as the start transfer frame, wherein the secondary header of each of the intermediate transfer frames comprises information for specifying the transfer frame as an intermediate transfer frame, wherein the secondary header of the end transfer frame comprises information for specifying the transfer frame as the end transfer frame, wherein the secondary header of the start transfer frame comprises information about the file ID, file length and name of the file which is to be transmitted, and wherein the secondary header of each of these transfer frames comprises information about the file ID.

2. Method according to claim 1, further comprising one of the following:

code rates for Reed Solomon, interleavers with depth up to 65536,

Periodically inserting synchronization symbols in between the transfer frames,

Adding a 32-bit counter after every synchronization symbols for identifying a position of an interleaved page.

3. The method of claim 1, wherein the spacecraft is a CubeSat.

4. The method of claim 1, wherein the optical channel is a free space optical channel.

* * * * *